United States Patent
Pickett et al.

(10) Patent No.: US 8,019,759 B2
(45) Date of Patent: Sep. 13, 2011

(54) CONVERSION OF DATA FROM A FIRST FILE TYPE TO A SECOND FILE TYPE FOR USE BY A TELECOMMUNICATIONS EQUIPMENT INVENTORY SYSTEM

(75) Inventors: Roy C. Pickett, Charlotte, NC (US); Robert M. Morrow, Jr., Matthews, NC (US)

(73) Assignee: AT&T Intectual Property I, LP, Atlanta, GA (US)

( * ) Notice: Subject to any disclaimer, the term of this patent is extended or adjusted under 35 U.S.C. 154(b) by 514 days.

(21) Appl. No.: 11/928,952

(22) Filed: Oct. 30, 2007

(65) Prior Publication Data
US 2008/0281792 A1    Nov. 13, 2008

Related U.S. Application Data (60) Provisional application No. 60/917,164, filed on May 10, 2007.

(51) Int. Cl.
 *G06F 17/30* (2006.01)
 *G06F 17/00* (2006.01)
(52) U.S. Cl. ........................ 707/736; 707/634
(58) Field of Classification Search ............... 707/999.1, 707/999.101, 999.102, 634, 736
See application file for complete search history.

(56) References Cited

U.S. PATENT DOCUMENTS

| | | | |
|---|---|---|---|
| 6,260,043 B1 * | 7/2001 | Puri et al. | 1/1 |
| 6,643,652 B2 * | 11/2003 | Helgeson et al. | 1/1 |
| 7,007,046 B2 * | 2/2006 | Manley et al. | 1/1 |
| 7,039,645 B1 * | 5/2006 | Neal et al. | 1/1 |
| 7,295,960 B2 * | 11/2007 | Rappaport et al. | 703/13 |
| 7,523,144 B2 * | 4/2009 | Chidiac et al. | 1/1 |

OTHER PUBLICATIONS

CMC Software—WinLEBCI, Communications Manufacturing Company, http://www.gotocmc.com/software.asp, http://www.gotocmc.com/products/LEBCI/, Copyright 2003.

* cited by examiner

*Primary Examiner* — Yicun Wu
(74) *Attorney, Agent, or Firm* — Parks IP Law LLC; Jennifer P. Medlin, Esq.

(57) ABSTRACT

Data files produced by one inventory scan are converted for use by a different inventory process so that multiple inventory scans to address multiple inventory processes are avoided. A subset of the categories of data from a first data file is extracted and included in a second data file. The second data file is provided with a different file type and format than the first data file. Additional information may be provided within the second data file such as data provided as user input and/or data that is looked-up from other sources. The second data file is uploaded to an inventory process such as by being sent to a file transfer protocol server where it is available for subsequent consideration by an inventory server.

19 Claims, 9 Drawing Sheets

| | A | B | C | D | E | F | G | H | I | J |
|---|---|---|---|---|---|---|---|---|---|---|
| 1 | CLLI | FLOOR FRAME | ECI | STATUS | QTY | CPR | PRICE | HECI | FRC | ECN |
| 2 | CHRLNCCAT00 | FCDSIM 01 | 877235 | W | 1 | 382239 | | E5PQA1R | 377C | 607 |
| 3 | CHRLNCCAT00 | FCDSIM 01 | 854695 | W | 1 | 770986 | | T3C1BB1 | 357C | 809 |
| 4 | CHRLNCCAT00 | FCDSIM 01 | 834121 | W | 1 | 970489 | | SNCLG0X | 357C | 863 |
| 5 | CHRLNCCAT00 | FCDSIM 01 | 826619 | W | 1 | 973500 | | T3DA3AA | 357C | 809 |
| 6 | CHRLNCCAT00 | FCDSIM 01 | 862268 | W | 1 | A72383 | | T1L2FY0 | 257C | 819 |
| 7 | CHRLNCCAT00 | FCDSIM 01 | 838390 | W | 1 | B70371 | | SLICWUE | 257C | 810 |
| 8 | CHRLNCCAT00 | FCDSIM 01 | 325144 | W | 1 | K73433 | | VAC4US0 | 257C | 819 |
| 9 | CHRLNCCAT00 | FCDSIM 01 | 367358 | W | 6 | M70178 | | SOUIATS | 357C | 863 |
| 10 | CHRLNCCAT00 | FCDSIM 01 | 374323 | W | 1 | W70724 | | VAUIAKH | 257C | 819 |
| 11 | CHRLNCCAT00 | FCDSIM 01 | 753880 | W | 1 | 470296 | | E5PQ12A | 377C | 607 |
| 12 | CHRLNCCAT00 | FCDSIM 01 | 311263 | W | 1 | D73379 | | SOI3770 | 357C | 863 |
| 13 | CHRLNCCAT00 | 04 00.02 | 208527 | W | 2 | C70689 | | PWPQAK6AAA | -7C | 983 |
| 14 | CHRLNCCAT00 | 04 00.02 | 208560 | W | 2 | C70704 | | PWPQALHAAA | -7C | 983 |
| 15 | CHRLNCCAT00 | 04 00.02 | 208586 | W | 1 | C70710 | | PWPQALKAAA | -7C | 983 |
| 16 | CHRLNCCAT00 | 04 00.02 | 208594 | W | 1 | C70718 | | PWPQALUAAA | -7C | 983 |
| 17 | CHRLNCCAT00 | 04 00.02 | 211495 | W | 2 | C70701 | | PWPQALEAAB | -7C | 983 |
| 18 | CHRLNCCAT00 | 04 00.02 | 237371 | W | 1 | C70720 | | PWPQALWAAC | -7C | 983 |
| 19 | CHRLNCCAT00 | 04 00.02 | 254479 | W | 1 | C70703 | | PWPQALGAAL | -7C | 983 |
| 20 | CHRLNCCAT00 | 04 00.02 | 202644 | W | 1 | 680834 | | PWDQAGAUAA | -7C | 983 |

```
CLLI, FLOORFRAME, ECI, STATUS, QTY, CPR, PRICE, HECI, FRC, ECN, BASIC UNIT, PART NUM, MFR, CPR DESC
CHRLNCCAT00, FCDSIM 01, 877235, W, 1, 382239,  E5PQA1R,   E5PQA1R,   377C, 607,  E5PQA1R,
CHRLNCCAT00, FCDSIM 01, 854695, W, 1, 770986,  T3C1BB1,   T3C1BB1,   357C, 809,  T3C1BB1,
CHRLNCCAT00, FCDSIM 01, 834121, W, 1, 970489,  SNCLGOX,   SNCLGOX,   357C, 863,  SNCLGOX,
CHRLNCCAT00, FCDSIM 01, 826619, W, 1, 973500,  T3DA3AA,   T3DA3AA,   357C, 809,  T3DA3AA,
CHRLNCCAT00, FCDSIM 01, 862268, W, 1, A72383,  T1L2FY0,   T1L2FY0,   257C, 819,  T1L2FY0,
CHRLNCCAT00, FCDSIM 01, 838390, W, 1, B70371,  SLICWUE,   SLJCWUE,   257C, 810,  SLJCWUE,
CHRLNCCAT00, FCDSIM 01, 325144, W, 1, K73433,  VAC4USO,   VAC4USO,   257C, 819,  VAC4USO,
CHRLNCCAT00, FCDSIM 01, 367358, W, 1, M70178,  SOUIATS,   SOUIATS,   357C, 863,  SOUIATS,
CHRLNCCAT00, FCDSIM 01, 374323, W, 1, W70724,  VAUTAKH,   VAUTAKH,   257C, 819,  VAUTAKH,
```

```
CHRLNCCAT00, 22529, SWRE
SHLBNCMAT00, 22231, SWRE
```

FIG. 7

| CHRLNCCA | CHRLNCCA | 22520#04##403.06 | 160ARV0704110090459 | | | | | |
|---|---|---|---|---|---|---|---|---|
| > | > | > | > | > | > | > | > | |
| > | > | > | > | > | > | > | > | |
| % | | | | | | | | |
| 630866 | 630866 | 630866 | 630866 | 630866 | 630866 | 630866 | 630866 | 630866 |
| 630866 | 630866 | 630866 | 630866 | 630866 | 630866 | 630866 | 630866 | 630866 |
| 630866 | 630866 | 630866 | 630866 | 630866 | 630866 | 630866 | 630866 | 630866 |
| 630866 | 630866 | 630866 | 630866 | 630866 | 630866 | 630866 | 630866 | 630866 |
| 630866 | 630866 | 630866 | 630866 | 630866 | 630866 | 630866 | 630866 | 630866 |
| 630866 | 630866 | 630866 | 630866 | 630866 | 630866 | 630866 | 630866 | 630866 |

FIG. 8

```
REM *** SELF - ERADICATING BATCH FILE ***
RENAME LEBCI. INV INV.07041014414141  'RENAME TO INV. <DATESTAMP>
FTP -S: FTP.TXT 90.11.124.168  'UPLOAD USING FTP. TXT AS SCRIPT
ERASE FTP. TXT  'ERASE FTP SCRIPT
ERASE UPLOAD . BAT 'ERASE THIS FILE.
```

```
ANONYMOUS
PTXXYZN
CD /U/AL/ FILES/LEBCI/AAN/SCAN/
SEND C:\LEBCI\INV.07041014414141
BYE
```

| | A | B | C | D | E | F | G | H | I | J | K | J | N |
|---|---|---|---|---|---|---|---|---|---|---|---|---|---|
| | CLLI | FLOORFR | ECI | STATUS | QTY | CPR | PRICE | HECI | FRC | ECN | BASIC UNIT PART NUM | MFR | CPR DESC |
| 1 | | | | | | | | | | | | | |
| 2 | CHRLNCC | FCDSM | 864695 | W | 1 | 770986 | | 73C1BB1 | 367C | 809 | T3C1BB1 | TSLS | TITAN-6600 DS3/1PT |
| 3 | CHRLNCC | FCDSM | 834121 | W | 1 | 970489 | | SNCLG0X | 367C | 863 | SNCLG0X | WECO | DS3INTFC CP |
| 4 | CHRLNCC | FCDSM | 826619 | W | 1 | 973600 | | T3DA3AA | 367C | 809 | T3DA3AA | WECO | DACS IV PACK CKT M |
| 5 | CHRLNCC | FCDSM | 862268 | W | 1 | A72383 | | T1L2FY0 | 267C | 819 | T1L2FY0 | FGTS | HLU-231 HDSLCO LN |
| 6 | CHRLNCC | FCDSM | 838390 | W | 1 | E70371 | | S-ICWUE | 267C | 810 | SLICWUJE | RTEC | DISC*S DL CHA UN |
| 7 | CHRLNCC | FCDSM | 326144 | W | 1 | K73433 | | VAC4US0 | 267C | 819 | VAC4US0 | ALCL | A1000 COT LW PASS |
| 8 | CHRLNCC | FCDSM | 367368 | W | 1 | M700178 | | SQUATS | 367C | 863 | SQUIATS | WECO | DS3/EC1TERMN CP |
| 9 | CHRLNCC | FCDSM | 374323 | W | 1 | W70724 | | VAUIAKJ | 267C | 819 | VAUIAKJ | ALCL | MLT ADSL LN TERMN |
| 10 | CHRLNCC | FCDSM | 311263 | W | 1 | D73379 | | S013770 | 367C | 863 | S013770 | NNTM | S/DML IJ-T MLT FUN |
| 11 | CHRLNCC | F OP RP | 301629 | W | 1 | F70237 | | SNPQCML | 367C | 863 | SNPQCML | FJTU | FLM-2400 BLSR HS S |
| 12 | CHRLNCC | F OP RP | 365414 | | | W72851 | | VAUIAG6 | 267C | 819 | VAUIAG6 | ALCL | ECNT-A NETTERMN |

CONVERSION OF DATA FROM A FIRST FILE TYPE TO A SECOND FILE TYPE FOR USE BY A TELECOMMUNICATIONS EQUIPMENT INVENTORY SYSTEM

RELATED APPLICATIONS

The present application claims priority to U.S. Provisional Application No. 60/917,164 filed on May 10, 2007, and entitled File Converter.

TECHNICAL FIELD

Embodiments relate to the inventory of telecommunications equipment. More particularly, embodiments relate to the conversion of data from a first file type to a second file type for use by a telecommunications equipment inventory system.

BACKGROUND

Telecommunications equipment is inventoried for various reasons by telecommunications service providers. For example, the telecommunications equipment may be inventoried for financial reasons, such as to find capital for tax and financial services. The telecommunications equipment may also be inventoried for other reasons, such as to track part change notices to identify equipment such as plugs that have been recalled by the manufacturer. For each of these different purposes, different software may be implemented and thus may require a different file type, file format, file content and so forth.

The inventorying process is laborious. Each item to be inventoried must be manually scanned. Where inventorying is necessary for different purposes, a separate scan for each purpose is typically done with each scan producing a file type, file format, and file content that is suitable for the software that handles that purpose. Relatively large facilities such as central offices in large cities may have tens of thousands of items of equipment to be scanned. Thus, a single scan can take numerous worker-hours to complete. Therefore, scanning the inventory each time an inventory count for a different purpose is needed is a highly inefficient manner of handling the inventory tasks.

SUMMARY

Embodiments address issues such as these and others by taking one data file for one inventory purpose that is produced as a result of one inventory scan and converting it to a second data file that is suitable for a second inventory purpose that is different than the first. Thus, rather than creating the second data file by performing a second scan of the same inventory, the second data file is available as a result of converting the file from the first scan that was used for the first inventory purpose.

Embodiments provide a computer readable medium containing instructions that perform acts that include receiving a first data file of a first type that contains a plurality of categories of data related to telecommunications equipment. The data of the plurality of categories is arranged in a first format. The acts further include extracting a subset of the plurality of categories of data and arranging the subset into a second format that is different than the first format. Additionally, the acts include creating a second data file of a second type different than the first type that contains the subset arranged into the second format and inputting the second data file into an inventory system to make a determination about the telecommunications equipment.

Embodiments provide a computer system that uploads information regarding telecommunications equipment inventory. The computer system includes a network interface and a processor. The processor receives a first data file that includes a plurality of categories of data regarding the telecommunications equipment inventory where the data of the plurality of categories being arranged in a first format. The processor extracts a subset of the plurality of categories of data and arranges the subset into a second format that is different than the first format. The processor also creates a second data file of a second type different than the first type that contains the subset arranged into the second format and uploads the second data file via the network interface as input into an inventory system that makes a determination about the telecommunications equipment.

Embodiments provide a computer-implemented method of uploading information regarding telecommunications equipment inventory. The method involves receiving a first data file that includes a plurality of categories of data regarding the telecommunications equipment inventory where the data of the plurality of categories being arranged in a first format and extracting a subset of the plurality of categories of data. The method further involves arranging the subset into a second format that is different than the first format and creating a second data file of a second type different than the first type that contains the subset arranged into the second format. Additionally, the method involves uploading the second data file via a network interface as input into an inventory system that makes a determination about the telecommunications equipment.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for conversion of data representative of telecommunication equipment inventory from a first data file to another. The first data file may have a different arrangement, format, content, and file type than what is needed for a particular inventory system. Data is extracted from the first data file, arranged into a second data file of a second type, and provided to the inventory system.

Figure 1:
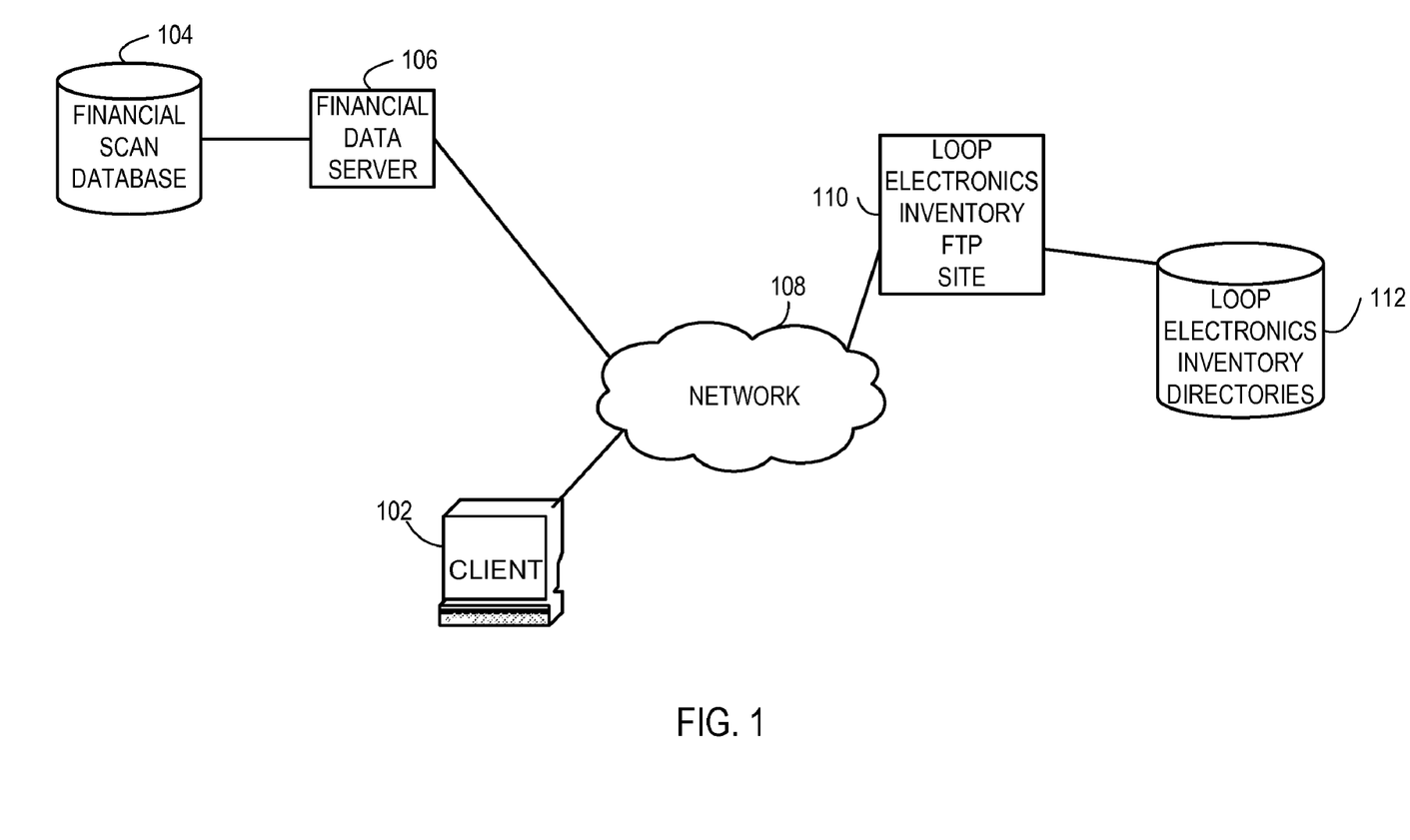
FIG. 1 shows an example of an operating environment for various embodiments that convert inventory files.

FIG. 1 shows an example of an operating environment for the various embodiments. A user may operate a client computer 102 that accesses various data stores. For example, the client computer 102 may have local storage that maintains inventory data of one or more formats. As other examples, the client computer 102 may have network connectivity through a data network 108 such as a network that employs protocols such as TCP/IP, Ethernet, and the like, so that the client computer 102 can access data from or submit data to various remote systems.

One example of a remote system is a financial data server computer 106. This financial data server 106 may maintain a database 104 that includes data files produced as a result of manual scans of telecommunications equipment inventory. Such scans may be performed to produce inventory data that is relevant to financial reporting, such as for capitalization purposes. This financial data may include various fields of information about each particular item of equipment that has been scanned. An example of the contents of such a data file is discussed below in relation to FIG. 5. Such a financial scan may be referred to as an Annual Reconciliation Valuation (ARV).

Another example of a remote system is a loop electronics inventory server computer 110. In the example shown in FIG. 1, this server computer 110 acts as a file transfer protocol (FTP) server for a Loop Electronic Bar Code Inventory (LEBCI) system where the server computer 110 receives the scan files containing the inventory information from a scanning system, or receives converted files containing the inventory information from the client computer 102 or other computer according to the embodiments disclosed herein. The LEBCI system, which is well-known in the art, may then provide the inventory information to other well-known systems such as the Loop Engineering Information System (LEIS) and the Loop Electronics Inventory Module (LEIM). The server computer 110 may maintain a collection of LEBCI directories within a storage device 112. Each directory location may correspond to a different physical location where telecommunication equipment being inventoried is located.

Figure 2:
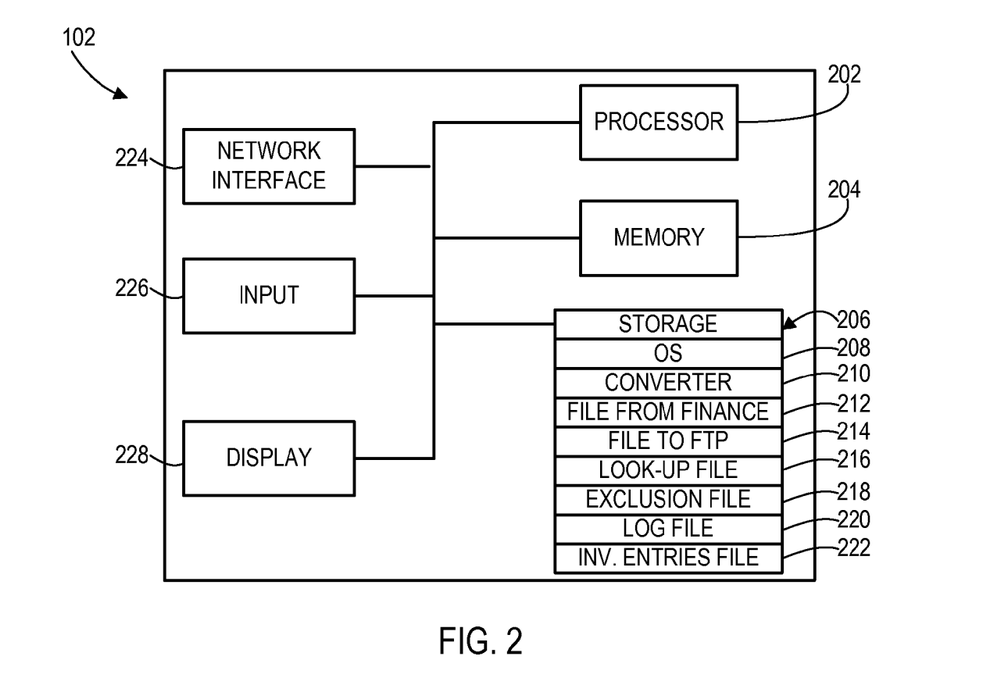
FIG. 2 shows an example of a computer system according to various embodiments that convert inventory files.

FIG. 2 shows an example of the client computer 102. The client computer 102 includes a processor 202 that performs logical operations to bring about various functions. Examples of some of these logical operations are discussed below in relation to FIGS. 3, 4A, and 4B. The processor 202 may be of various forms such as a general purpose programmable processor, an application specific processor, hardwired digital logic, or combinations thereof. The processor 202 may interact with various components such as a memory device 204. The memory device 204, which may be volatile, non-volatile or a combination, may store programming and other data being used by the processor 202 when implementing the logical operations.

The processor 202 may also interact with a storage device 206. The storage device 206 may serve to store various programs such as an operating system 208 and a file converter program 210. The storage device 206 may also store various data files such as a first date file 212 from the financial data server 106 and a second data file 214 that results from converting the first data file 212 and that will be uploaded to the inventory server computer 110. Other data files on the storage device 206 may include a look-up file 216 that may contain associations of information relevant to performing the file conversion, an exclusion file 218 that may contain information regarding what should be included/excluded when creating the second data file 214, a log file to track the file conversions that have been done, and an invalid entries file 216 that may be created to list those items of equipment that were not included in the second data file 214 due to an error. Each of these data files is discussed below in relation to the logical operations.

The processor 202, memory 204, and storage device 206 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 202 may also interact with other components of the client computer 102 such as input device(s) 226, output device(s) 228, and a network interface 224. The input devices 226 may include a keyboard, mouse, touchpad, and the like. The output devices 228 may include a display screen, speakers, and so forth. The network interface 224 may be a wired or wireless connection to the data network 108 using any of a variety of networking protocols.

Figure 3:
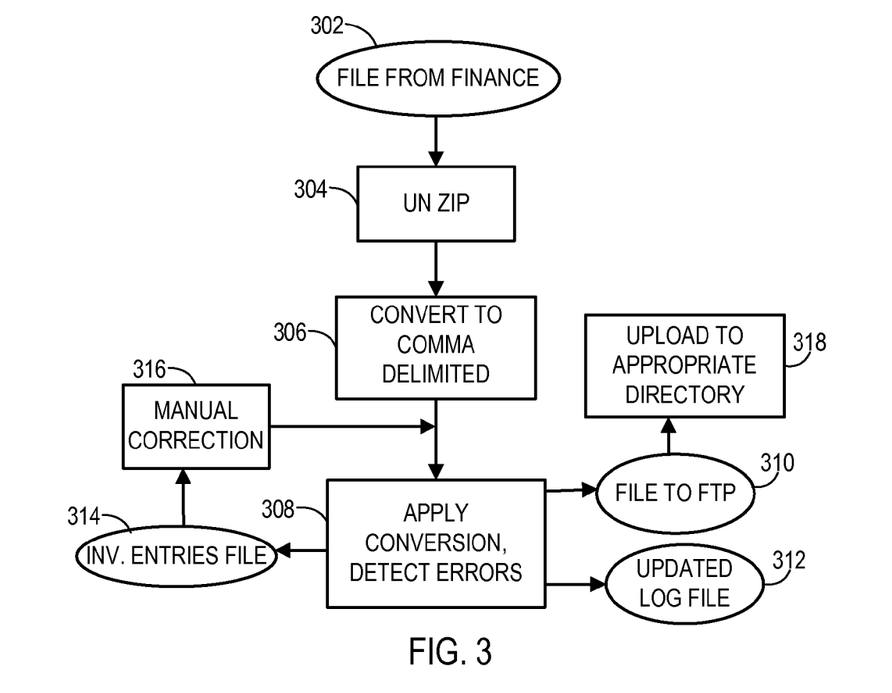
FIG. 3 shows an example of conversion flow according to various embodiments.

FIG. 3 shows a high-level operation flow to the file conversion process performed by the processor 202 such as when implementing the file converter program 210. Initially, the processor 202 obtains the first data file 212 that has been previously downloaded from the financial server 106 at a file operation 302. This first data file 212 may be stored in a zipped file format to save storage space so that processor 202 may extract the first data file 212 from the zipped file format at an unzip operation 304. There are a variety of commercially available tools for unzipping files such as WinZIP or Freebyte Zip.

Figure 5:
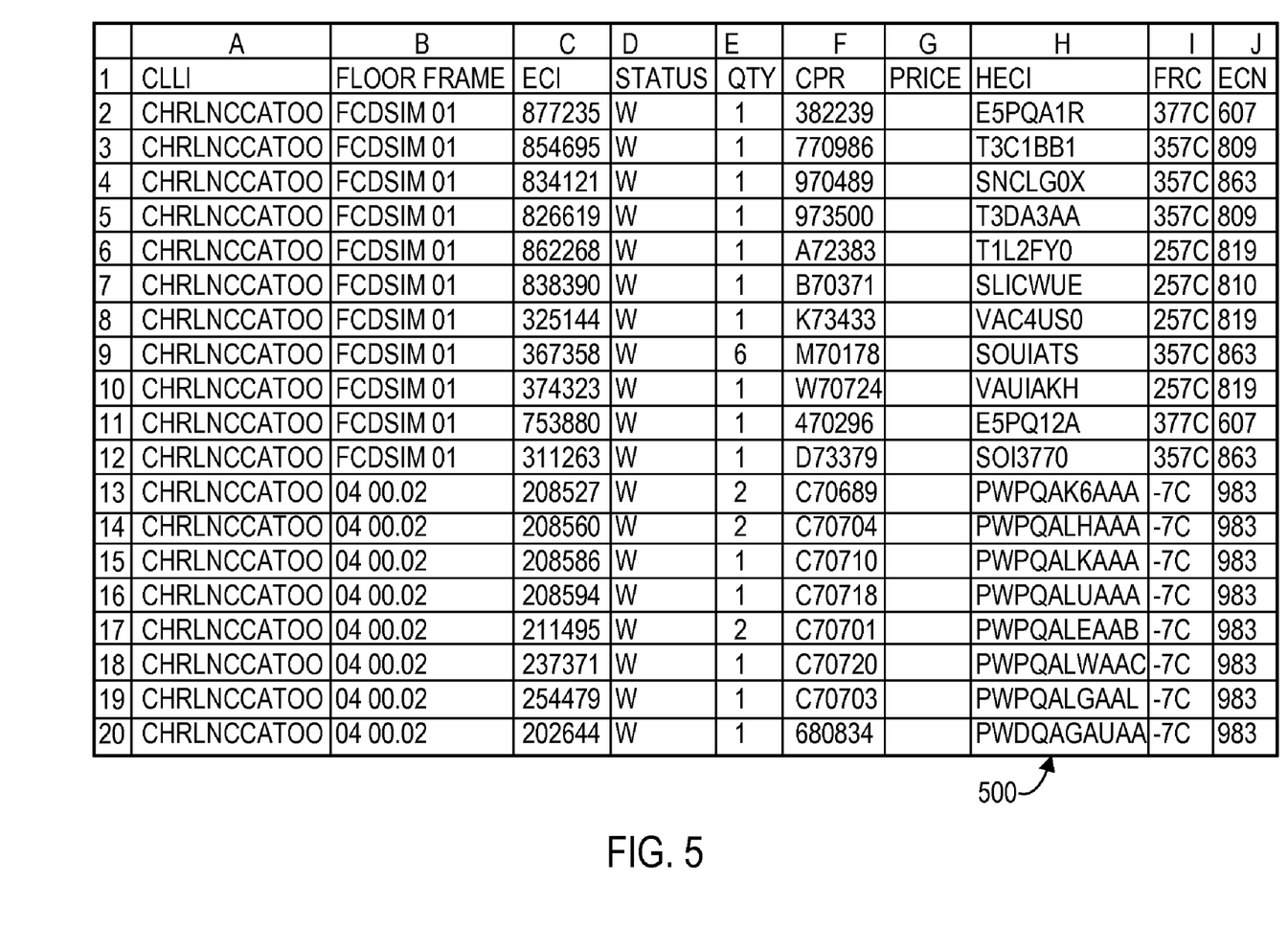
FIG. 5 shows an example of a first data file created by a scan for a first inventory process.

Upon having the first data file 212 extracted from the zipped format, the first data file 212 may be in a proprietary format, such as being a MICROSOFT EXCEL® spreadsheet file. FIG. 5 shows an example of a screenshot 500 that includes the contents of a first data file 212 in a spreadsheet format. The first data file 212 has content that when displayed is arranged into several columns of data with each column including an item of information pertinent to a particular item of telecommunications equipment.

As shown, the columns from left to right represent a Common Language Location Identifier (CLLI) that identifies a central office and wire center where the item of equipment is located, a floor and relay rack location including a shelf (FloorFrame) where the item of equipment is located, and an Electronic Catalog Item (ECI) that identifies the piece of equipment. Each row of the spreadsheet corresponds to a different type of item of equipment for a given floor and relay rack position of a given central office as the ECI varies from one row to the next for a given CLLI and FloorFrame. Additional columns include a functional status (Status) of the item type and a number (Qty) of units of this item type on the given shelf. According to one or more embodiments such as discussed below in FIGS. 4A and 4B, some or all of these items of information are pertinent to the inventory system such as the LEBCI.

Other items of information may also be present within a first data file 212 from the financial server 106. These include a Continued Property Record (CPR), a price (Price) per unit, a Human Equipment Code Identifier (HECI), a Field Reporting Code (FRC), an Equipment Category Number (ECN), and a unit classification (Basic Unit). Other information truncated from FIG. 5 may also be included such as a vendor part number, a manufacturer name, a Continued Property Record Description (CPR Desc), and the like.

Figure 6:
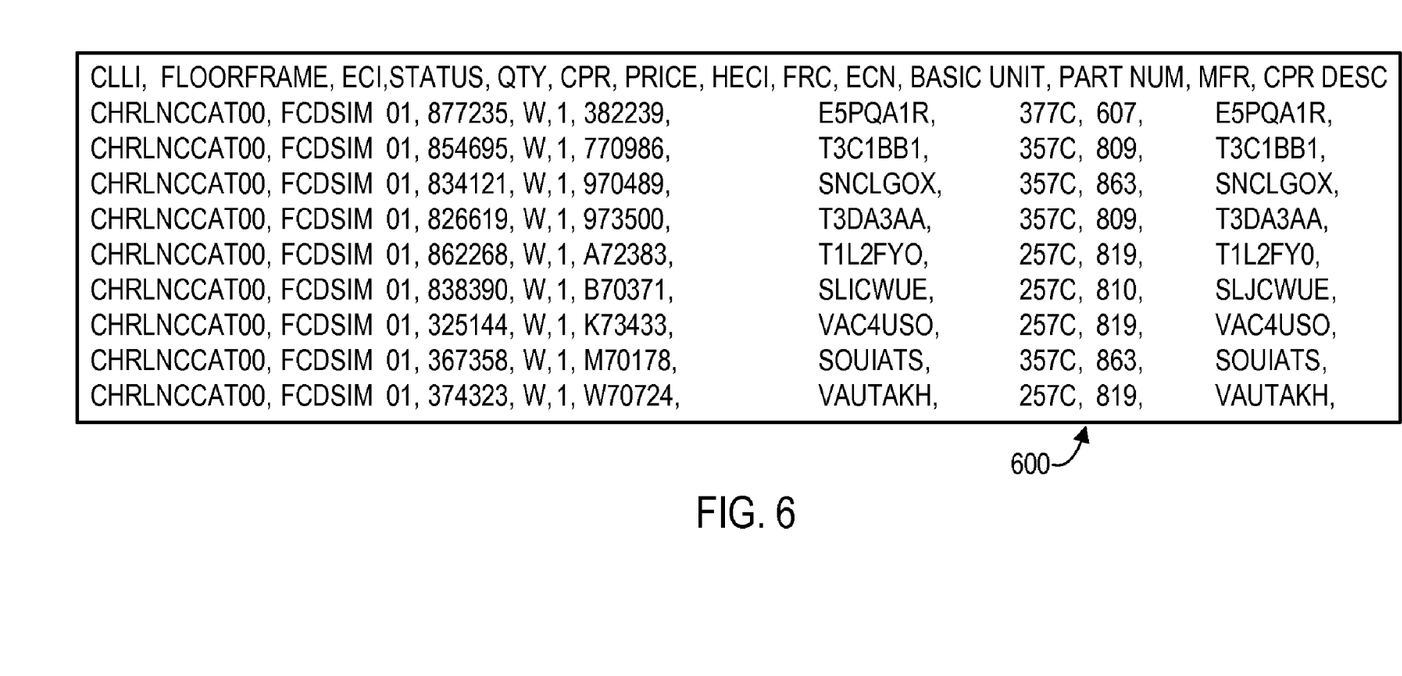
FIG. 6 shows an example of an intermediate data file created from the first data file.

In this embodiment, rather than attempting to manipulate data directly from the first data file 212, the first data file 212 is first converted to an intermediate file at a conversion operation 306 where the intermediate data file is more readily manipulated, such as a comma delimited file like that shown in FIG. 6. There are commercially available options for producing the comma delimited format from a MICROSOFT EXCEL® spreadsheet file such as by opening the file and then saving it as a comma delimited file type or by utilizing a program such as an ABC Amber EXCEL® converter program.

A screenshot 600 shows the contents of the comma delimited file. It can be seen that this file maintains the column names in order and separates them by commas. It can also be seen that this file maintains the data values of each row in order and separates them by commas.

Returning to FIG. 3, at this point, the processor 202 applies the logical operations of a conversion operation 308 which involve accessing the comma delimited file that has been created in order to create the second data file 214, indicated here as File to FTP 310, to detect errors in the rows of information and to create an invalid entries file 314, and to update a log file 312 to reflect the creation of the second data file 214 and the invalid data file 314 and to reflect the status of the FTP transaction.

Upon creation of the second data file 214, or File to FTP 310, this second data file 214 is then uploaded to an appropriate directory of the storage device 112 via the inventory system server 110 at an upload operation 318. A manual correction may be made to rows of the invalid entries file 314 at a correction process 316 and the contents of that corrected file may then be introduced as input to the conversion operation 306 to create another File to FTP 310. The invalid data file 314 discussed below in relation to FIG. 11.

Figure 4A:
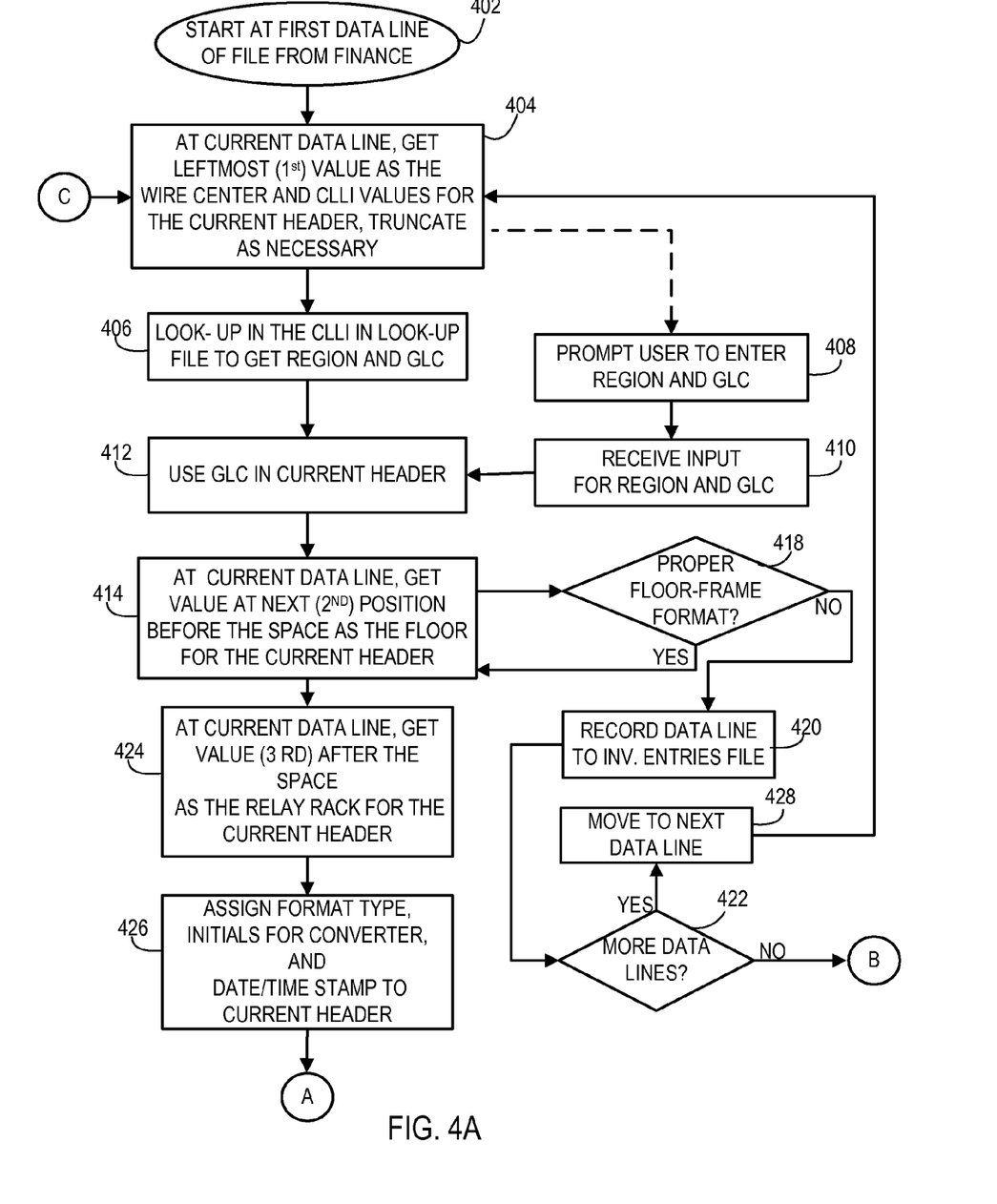
FIGS. 4A and 4B show an example of logical operations according to various embodiments that may be implemented to produce a converted file for uploading to an inventory system.
Figure 4B:
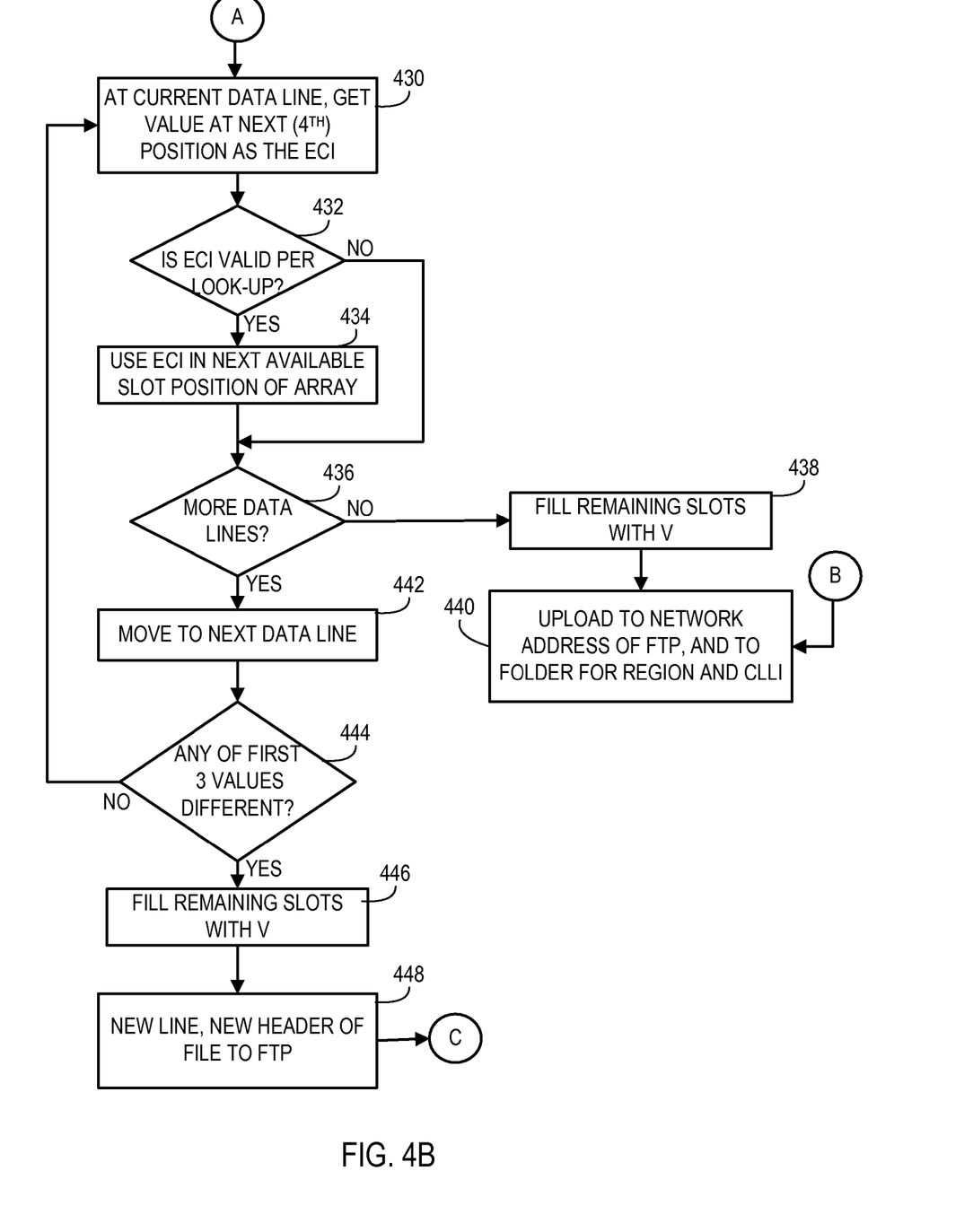

FIGS. 4A and 4B show an example of logical operations that may be performed by the processor 202 when implementing the conversion operation 306. The processor 202 begins by starting at the first data line of the intermediate file, or comma delimited file, that has been produced from the first data file 212. These logical operations are discussed in terms of a certain structure being present within the intermediate data file. In this case, the structure is as shown in FIG. 6 where a first line presents the headers of the columns and the second line serves as the first data line. In this case, the structure is further known to present the data values in the left-to-right order shown in FIG. 6 with commas as the separators. It will be appreciated that the extraction of data may proceed in other manners should the structure of the intermediate file be different.

Starting at a first data line of the intermediate file 402, then at a first value operation 404, the processor 202 obtains the leftmost data value from the first data line of the intermediate file. For example, this value would be CHRLNCCAT00 from the example of FIG. 6. This value will be included in a header of one example of the second data file 214 as both the wire center and the CLLI, since the two are the same in this example. This header identifies the physical location and precedes an array within the second data file 214 where each item of equipment for that physical location will be listed. To the extent this value exceeds a maximum size available for the wire center and CLLI portions of the header, this value may be truncated.

Figure 7:
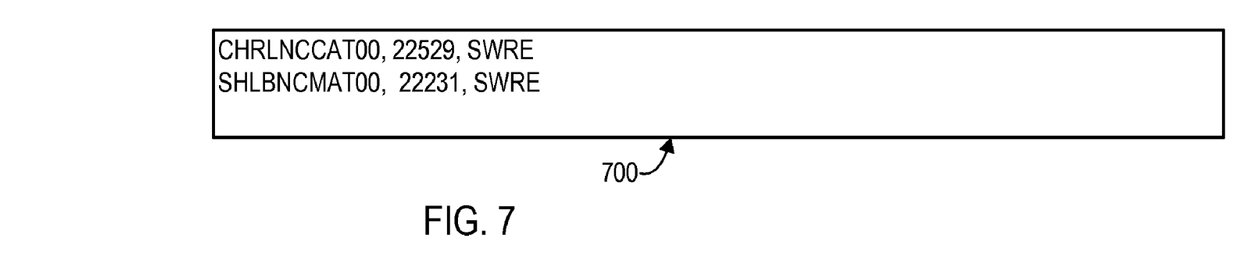
FIG. 7 shows an example of a supplemental data file that maintains associations of equipment data.

In addition to the wire center and CLLI, for this example, the header also contains a Geographic Locator Code. Furthermore, the region where this wire center is located is relevant to the uploading of the second data file 214. Neither the GLC nor the region is found in the first date file 212 according to this example. Therefore, the GLC and region are discovered by other techniques. For example, the processor 202 may have access to the look-up file 216 which may associate the CLLI to the GLC and the region. An example of a look-up file 216 is shown in FIG. 7 where a screenshot 700 shows the contents in a comma delimited format where the first value is the CLLI, the second value is the GLC, and the third value is the region. In that case, the processor 202 looks up the CLLI in the look-up file 216 at a look-up operation 406 to find the GLC and the region.

Where the look-up file 216 is not available or the processor 202 is not so configured, then the processor 202 may alternatively prompt the user via a visual display or other output to enter the GLC code and to enter the region at a prompt operation 408. The processor 202 then receives the GLC code and region as user input at an input operation 410.

Upon obtaining the GLC code, such as by either of the techniques discussed above, the processor 202 then inserts the GLC code into the current header that is being constructed by locating it after the CLLI value at a GLC operation 412. At the current data line within the intermediate file, the processor 202 then obtains the value at the next position before an empty space which is the floor value at a second value operation 414.

As a subset of logical operations, the processor 202 may detect whether the FloorFrame field is in a proper format for conversion at a query operation 418. The financial scan may produce FloorFrame data that does not properly set forth the floor and relay rack for all of the rows of the intermediate file. If the processor 202 finds that the FloorFrame information is not in a proper format, then the processor 202 records the current data line to the invalid entries file 314. In the case of an omitted floor, but valid frame it is assumed to be a single floor office and "01" is used as floor value.

Figure 11:
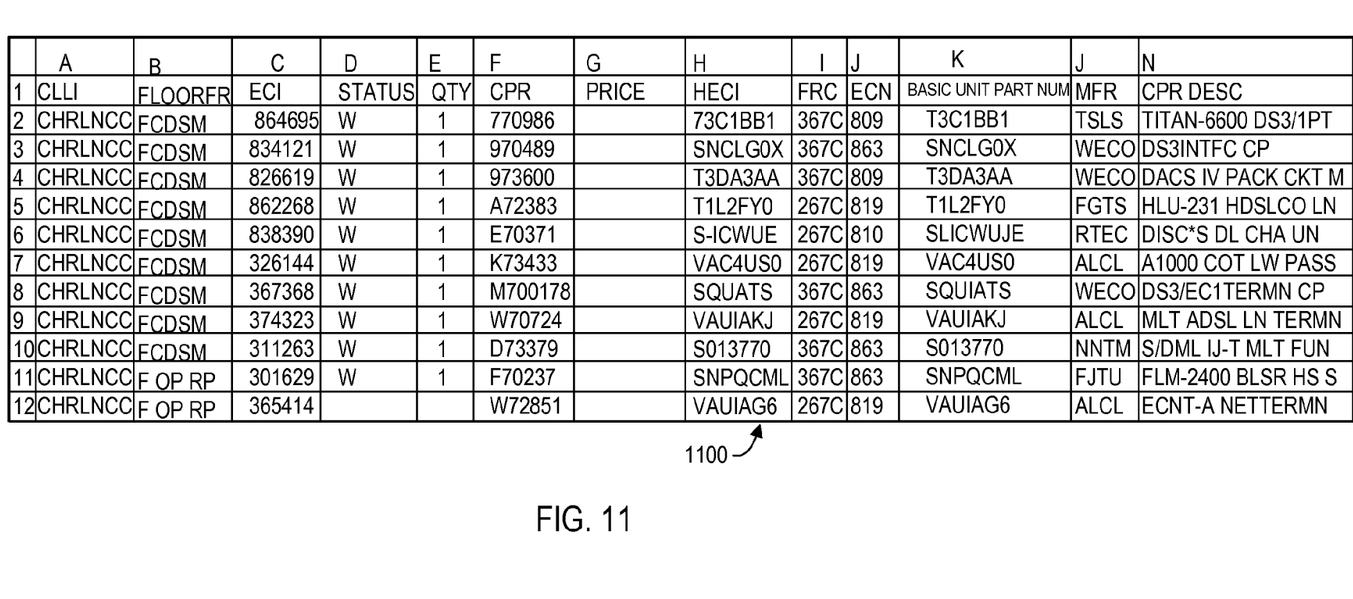
FIG. 11 shows an example of an additional data file where data that is determined to be invalid is stored according to various embodiments.

An example of the invalid entries file 314 is shown in FIG. 11. A screenshot 1100 shows the contents of one example of the invalid entries file 314. The invalid entries file 314 may be created in various formats including a comma delimited format. In this example, the invalid entries file 314 is created in the comma delimited format but has been opened within a spreadsheet program where the comma delimited format has been interpreted to produce the rows and columns of the spreadsheet. The columns match those of the first data file 212 while the rows are those data lines containing the improper FloorFrame information. As discussed above, the user may manually correct the FloorFrame information within the invalid entries file 314 and then re-introduce the invalid entries file 314 as the input to the conversion operations shown in FIGS. 4A and 4B such that the file to FTP 310 may be created to include the items represented by the invalid entries file and may be uploaded to the inventory system server 110.

Returning to FIG. 4A, after recording the line with the improper format to the invalid entries file 314, the processor 202 then checks to see if the intermediate file contains more data lines at query operation 422. If not, then operational flow proceeds to an upload operation 440 of FIG. 4B which is discussed below. If there are more data lines of the intermediate file, then the processor 202 moves to the next data line at line operation 428 and then begins looking for the information within this line to include in the current header by returning to first value operation 404.

Returning to the query operation 418, if the processor 202 finds that the FloorFrame format of the current data line is proper, then the processor 202 inserts the floor value separated from the GLC code by a literal delimiter, or # in the case of an LEBCI system at the second value operation 414. The processor 202 then obtains the relay rack number after the space from the floor number and includes it separated from the floor number by a literal delimiter at a third value operation 424. The processor 202 then completes the current header by assigning a matrix identifier, which is a known value for a given style of relay rack being inventoried, at a header operation 426. Here, the processor 202 also inserts the initials of the scanner which may be initials that represent the conversion process, such as arv, and also inserts the time and date stamp of the processing.

According to this example and the intermediate file shown in FIG. 6, the first data lines have invalid FloorFrame information. An example of a proper FloorFrame format for this example is 01 100.08B where 01 is the floor and 100.08 is the relay rack number and B is the shelf. For a first data line that includes the following information: chrlncca, 04 403.06B; and where the CLLI is related to 22520, the matrix identifier is 160, and the processing was done on Apr. 11, 2007 at 9:04:59, then the resulting LEBCI header is:

chrlncca         chrlncca         22520#04#403.06 160arv070411090459

Moving on to FIG. 4B, after completing the header, the processor 202 then begins to load the slot positions of an array that follows the header. As an example of the array for LEBCI format, a matrix identifier of 160 allocates 800 slots per relay rack, with 25 columns and 32 rows of data to account for those 800 slots. Thus where the header provides a matrix identifier of 160, then the array in the second data file 214 that follows this header will have 25 columns and 32 rows. For LEBCI format, it is known that each row is terminated with a carriage return (0Dh) and a linefeed (0Ah) and that the array is terminated with a percent sign (%).

The processor 202 begins filling the array under the current header, in correspondence with the matrix identifier, by getting each ECI value from the intermediate file that corresponds to the current header, and by including each ECI value a number of times specified by the quantity value of the intermediate data file. The processor 202 gets the ECI by looking to the next, or fourth value in the current data line of the intermediate data file to get an ECI value at a fourth value operation 430. The processor 202 then detects whether the ECI is valid by looking up the ECI value in the exclusion file 218 at operation 432. If the ECI is to be excluded, then operational flow proceeds to query operation 436 rather than including the ECI in the array. If the ECI is not found in the exclusion file 218, which may be considered as a dictionary file and may have a comma delimited or other format, then the processor 202 inserts the ECI value into the next available slot position of the array and repeats that ECI value for subsequent slot positions based on the quantity value at an array operation 434. The quantity value may be found by the processor 202 checking the sixth value position in the example shown in FIG. 6.

According to various embodiments, the conversion program that is executing may poll the LEBCI server 110 for information about the exclusion file 218 and receives information about the date of the file on the server. Then, the conversion program may compare this information with previously stored date information about the local copy of the exclusion file 218. Upon comparison, if the local copy information does not exist, or the date of the local copy is not the same as the copy on the LEBCI server 110, then a current exclusion file 218 may be downloaded from the LEBCI server 110 to replace the older version. Furthermore, a new file containing the data of this current exclusion file 218 may be saved for future comparison.

After including the ECI value the number of times specified by the quantity value, then the processor 202 checks for more data lines in the intermediate file at a query operation 436. If there are no more data lines, then there are no more ECI values to include so the processor 202 fills the remaining slot positions of the current array with a value that signifies the slot is empty and terminates the array, such as with the percent sign. For the LEBCI format, the processor 202 may insert a V at each remaining slot position. Furthermore, the lack of more data lines indicates that there are no more headers and arrays to place into the second data file. Therefore, the processor 202 has completed the second data file 214 and the processor 202 then uploads the second data file to the inventory server 110 at the upload operation 440. The upload is discussed in additional detail below.

Figure 8:
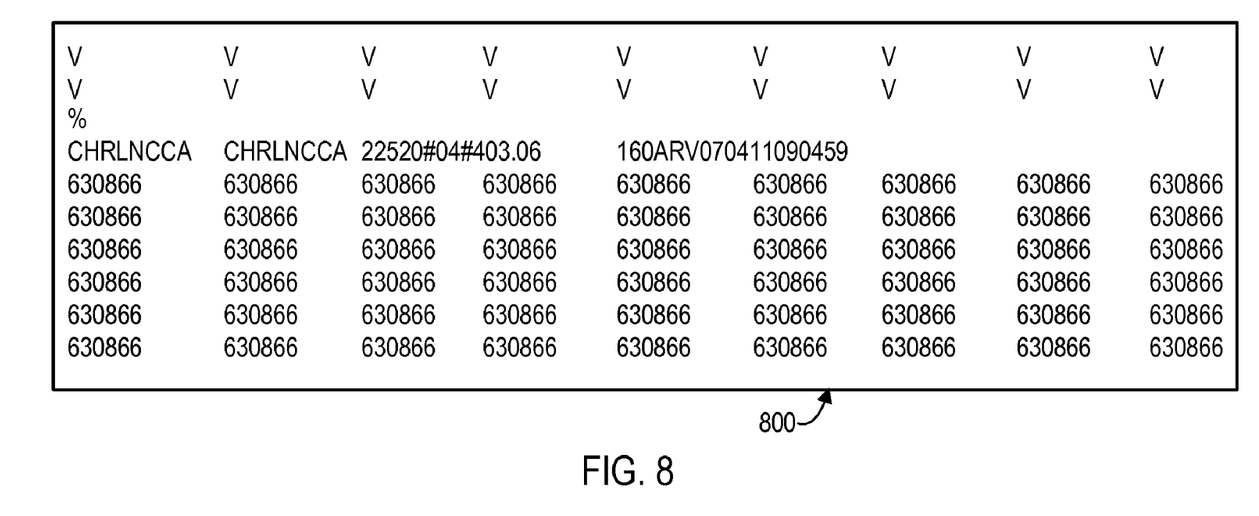
FIG. 8 shows an example of a second data file ready for uploading to an inventory process according to various embodiments.

FIG. 8 provides a screenshot 800 that shows a portion of the contents of one example of the second data file in the LEBCI format. Here, it can be seen that the header stated above is present. Above this header, the end of a previous array is present. The previous array has several empty slots as indicated by the V, and the array is terminated by the %. Below the header, the array corresponding to that header is present. In this example, a single ECI value is present at many different slot positions of the array as the quantity value specified in the data line of the intermediate file was much greater than one. For portions of the array that are not shown, other ECI values may be present if other ECI values were present in the intermediate file for the physical location represented by the header for this array.

Returning to the query operation 436 of FIG. 4B, where the processor 202 determines that there are more data lines to the intermediate file, then the processor moves to the next data line at a line operation 442. The processor 202 then detects whether any of the first three data values, namely the CLLI, the floor, and the relay rack number, are different for this current data line relative to the previous one at operation 444. If not, then this indicates that there are additional ECI values to be added to the current array so the processor 202 then gets the ECI value for the current data line back at fourth value operation 430 and proceeds with the logical operations. If one or more of the first three values are different, then this indicates that the data for the current header is finished and a new header and array are needed. The processor 202 completes the current array by filling in the remaining slot positions with the empty designation, such as the V for LEBCI, and terminates the array such as with the % at an array operation 446.

After having completed the array, the processor 202 then moves to a new line of the second data file 214 that is being created at a header operation 448. The processor 202 then begins the new header by looking at the first data value for the current data line of the intermediate file at the first value operation 404 and the logical operations proceed as discussed above.

Figure 9:
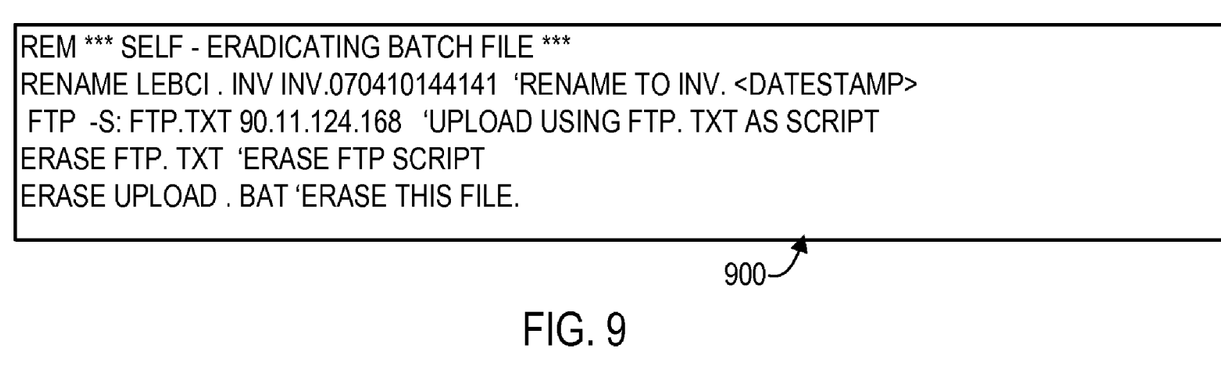
FIG. 9 shows an example of a batch file to initiate uploading of the second data file according to various embodiments.
Figure 10:
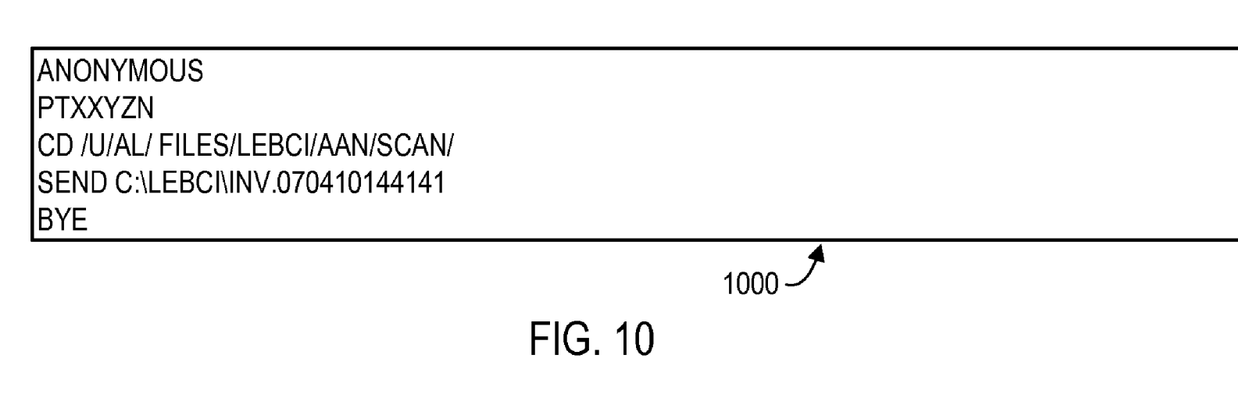
FIG. 10. shows an example of a script file to control the uploading of the second data file to an appropriate storage location according to various embodiments.

Returning to the upload operation 440, the upload process may be based on the region and also other information such as the CLLI in order to upload to an appropriate directory. FIGS. 9 and 10 illustrate two files of one example that may be implemented to perform the upload. As an alternative, the logic of one or both of these files may be integrated with the executable file responsible for the conversion operations. For example, an FTP command may be executed as a shell process of the executable program rather than being implemented by a batch file. In this embodiment and as shown in FIG. 9, a screenshot 900 shows the contents of a batch file that may be implemented to give the second data file an appropriate name for uploading, such as one based on the date and time of the creation. Furthermore, the batch file may be implemented to call upon a text file, such as the text file of FIG. 10, and to provide a network address for the upload. In the example shown in FIG. 9, the network address is being specified as an Internet Protocol version 4 address.

The text file of a screenshot 1000 of FIG. 10 shows that the destination for the upload is a directory /u/al/files/lebci/aan/scan/. This directory is relevant to the region as the "aan" represents the region that has been obtained by the processor 202 such as through one of the techniques discussed above. In this example, the CLLI for the second data file 214 to be uploaded is also relevant. In this particular example of FIG. 10, the CLLI present in the entries of the second data file 214 begins with "al" which represents the state of Alabama. Thus, this second data file pertains to Alabama and region aan, and the upload sends this second data file to the corresponding directory of the inventory system server 110.

Thus, as discussed above, a first data file of a first format that has been produced for one inventory purpose may be received and converted to a second data file of a second format to be used for a different inventory purpose. By producing the second data file from the conversion, the need to re-scan the telecommunications inventory represented in the first data file is eliminated.

While embodiments have been particularly shown and described, it will be understood by those skilled in the art that various other changes in the form and details may be made therein without departing from the spirit and scope of the invention.

What is claimed is:

1. A computer readable medium containing instructions that, when executed on a computer, cause the computer to perform acts comprising:
    receiving a first data file of a first type that contains a plurality of categories of data related to telecommunications equipment, the plurality of categories of data being arranged in a first format, wherein the first data file includes financial data related to the telecommunications equipment, the first data file being configured specifically for use in inventorying the telecommunications equipment for financial reporting;
    converting the first data file to an intermediate data file of a third type;
    extracting a subset of the plurality of categories of data, including extracting the subset from the intermediate data file;
    performing a logical operation to ensure that items in a field of the first data file are in a proper format;
    arranging the subset into a second format that is different than the first format;
    creating a second data file of a second type configured specifically for use in inventorying the telecommunications equipment for physical location tracking, wherein:
        the second data file has different content than the first data file;
        the second data file is different than the first type;
        the second data file contains the subset being arranged into the second format differing from the first format;
        the second data file is arranged in a manner differing from a manner in which the first data file is arranged;
        the first data file lacks data indicating a physical location of the telecommunications equipment; and
        the second data file includes data indicating physical location of the telecommunications equipment;
    inputting the second data file into an inventory system to make a determination about the telecommunications equipment based on the physical location of the telecommunications equipment; and
    in response to determining in performing the logical operation to ensure that items in the field of the first data file are not in the proper format:
        recording a current data line of an item being in an improper format to an invalid entries file arranged like the first data file is arranged; and
        uploading the invalid entries file to the inventory system.

2. The computer readable medium of claim 1, wherein the first type is a spreadsheet type.

3. The computer readable medium of claim 1, wherein the second type is a loop electronic bar code inventory array type.

4. The computer readable medium of claim 1, wherein the third type is a comma delimited version of the first type.

5. The computer readable medium of claim 1, wherein the acts further comprise:
    prompting a user to input an item of information; and
    including the item of information in the second data file.

6. The computer readable medium of claim 1, wherein the acts further comprise:
    performing a look-up of an item of information from the subset of the categories of data extracted from the first data file to find at least one additional item of information; and
    including the item of information in the second data file.

7. The computer readable medium of claim 6, wherein the item of information from the subset comprises a common language location identifier and wherein the at least one additional item of information comprises a geographical locator code.

8. The computer readable medium of claim 1, wherein the plurality of categories of the first data file include a common language location identifier, a floor frame designation, an equipment catalog item, and at least one of status, quantity, continued property record, price, human equipment code identifier, field reporting code, equipment category number, basic unit classification, vendor part number, manufacturer, and continued property record description, and wherein the subset of the plurality of categories that are extracted from the first data file and included in the second data file include at least the common language location identifier, the floor frame, and the equipment catalog item.

9. The computer readable medium of claim 8, wherein including the subset of categories in the second data file includes acts comprising:
    obtaining a wiring center designation and a geographical locator code pertinent to the common language location identifier;
    creating a header that comprises the wiring center designation, the common language location identifier, the geographical locator code, a floor value taken from the floor frame designation, a relay rack designation taken from the floor frame designation, a format designation, and a date and time stamp;

creating an array where an equipment catalog item value is entered at an available spot in the array and where a vacancy marker is entered at each spot in the array where no equipment catalog item value is present.

10. A computer system that uploads information regarding telecommunications equipment inventory, comprising:

a network interface;

a processor that (I) receives a first data file that includes a plurality of categories of data regarding the telecommunications equipment inventory, the plurality of categories of data being arranged in a first format, wherein the first data file includes financial data related to the telecommunications equipment, the first data file being configured specifically for use in inventorying the telecommunications equipment for financial reporting, (II) extracts a subset of the plurality of categories of data, including extracting the subset from the intermediate data file, (III) converts the first data file to an intermediate data file of a third type, (IV) performs a logical operation to ensure that items in a field of the first data file are in a proper format, (V) arranges the subset into a second format that is different than the first format, (VI) creates a second data file of a second type configured specifically for use in inventorying the telecommunications equipment for physical location tracking, wherein: (a) the second data file has different content than the first data file, (b) the second data file is different than the first type, (c) the second data file contains the subset being arranged into the second format differing from the first format, (d) the second data file is arranged in a manner differing from a manner in which the first data file is arranged, (e) the first data file lacks data indicating a physical location of the telecommunications equipment, and (f) the second data file includes data indicating at least one physical location of the telecommunications equipment, (VI) uploads the second data file via the network interface as input into an inventory system that makes a determination about the telecommunications equipment based on the physical location of the telecommunications equipment, and (VII) in response to determining in performing the logical operation to ensure that items in the field of the first data file are not in the proper format, (a) records a current data line of an item being in an improper format to an invalid entries file arranged like the first data file is arranged and (b) uploads the invalid entries file via the network interface as input to the inventory system.

11. The computer system of claim 10, further comprising a memory that stores a third data file that includes an association of an item of information of the subset of categories of data extracted from the first data file with an additional item of information and wherein the processor looks-up the item of information from the subset within the memory to find the association to the additional item of information and includes the additional item of information within the second data file.

12. The computer system of claim 10, further comprising an input device and a display device, wherein the processor displays a prompt to a user to enter an additional item of information, receives the additional item of information through the input device, and includes the additional item of information within the second data file.

13. The computer system of claim 10, further comprising an input device and a display device, wherein the processor detects an error in one or more items of information within the subset of categories of extracted data, records those items of information that have an error within a fourth data file, displays a prompt to a user to review items of information within the fourth data file, and displays the items of the fourth data file.

14. The computer system of claim 13, wherein the processor displays a prompt to the user to upload the second data file to the inventory system and uploads the second data file upon receiving a selection to upload.

15. A computer-implemented method of uploading information regarding telecommunications equipment inventory, comprising:

receiving a first data file that includes a plurality of categories of data regarding the telecommunications equipment inventory, the plurality of categories of data being arranged in a first format, wherein the first data file includes financial data related to the telecommunications equipment, the first data file being configured specifically for use in inventorying the telecommunications equipment for financial reporting;

converting the first data file to an intermediate data file of a third type;

extracting a subset of the plurality of categories of data, including extracting the subset from the intermediate data file;

performing a logical operation to ensure that items in a field of the first data file are in a proper format;

arranging the subset into a second format configured specifically for use in inventorying the telecommunications equipment for physical location tracking that is different than the first format;

creating a second data file of a second type configured specifically for use in inventorying the telecommunications equipment for physical location tracking, wherein:

the second data file has different content than the first data file;

the second data file is different than the first type;

the second data file contains the subset being arranged into the second format differing from the first format;

the second data file is arranged in a manner differing from a manner in which the first data file is arranged;

the first data file lacks data indicating a physical location of the telecommunications equipment; and the second data file includes data indicating physical location of the telecommunications equipment;

uploading the second data file via a network interface as input into an inventory system that makes a determination about the telecommunications equipment based on the physical location of the telecommunications equipment; and in response to determining in performing the logical operation to ensure that items in the field of the first data file are not in the proper format:

recording a current data line of an item being in an improper format to an invalid entries file arranged like the first data file is arranged; and uploading the invalid entries file via the network interface as input to the inventory system.

16. The computer-implemented method of claim 15, further comprising:

prompting a user to enter information regarding a location of the telecommunications equipment;

receiving the information regarding the location; and uploading the second data file to a destination based on the received information.

17. The computer-implemented method of claim 16, further comprising:
prompting the user to enter an additional item of information related to the telecommunications equipment;
receiving the additional item of information; and
including the additional item of information within the second data file.

18. The computer-implemented method of claim 15, further comprising:
performing a look-up of an item of information from the subset of the categories of data within a third data file to find an item of information that indicates a location of the telecommunications equipment; and
uploading the second data file to a destination based on the item of information that is from the third data file and that indicates the location of the telecommunications equipment.

19. The computer-implemented method of claim 18, further comprising:
during the look-up of the item of information from the subset of the categories of data, finding an additional item of information related to the telecommunications equipment; and
including the additional item of information within the second data file.

* * * * *